(12) United States Patent
Bradley et al.

(10) Patent No.: US 7,789,182 B2
(45) Date of Patent: Sep. 7, 2010

(54) AIR POWER ENERGY TRANSFORMATION TO ELECTRICAL ENERGY FOR HYBRID ELECTRIC VEHICLE APPLICATIONS

(75) Inventors: James C. Bradley, New Haven, IN (US); Sunil K. Jain, Fort Wayne, IN (US); Rodney J. Klinger, Fort Wayne, IN (US); Joseph T. Penaloza, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 12/604,813

(22) Filed: Oct. 23, 2009

(65) Prior Publication Data

US 2010/0108411 A1 May 6, 2010

Related U.S. Application Data

(62) Division of application No. 11/273,291, filed on Nov. 14, 2005, now abandoned.

(51) Int. Cl.
*B60K 25/00* (2006.01)
(52) U.S. Cl. .................... 180/165; 180/2.1; 180/2.2
(58) Field of Classification Search .......... 180/2.1, 180/2.2, 165, 65.31
See application file for complete search history.

(56) References Cited

U.S. PATENT DOCUMENTS

| | | | |
|---|---|---|---|
| 2,206,197 A * | 7/1940 | Reuben | 446/218 |
| 3,374,849 A * | 3/1968 | Redman | 180/2.2 |
| 3,556,239 A * | 1/1971 | Spahn | 180/65.25 |
| 3,740,565 A * | 6/1973 | Wesley | 290/55 |
| 3,876,925 A * | 4/1975 | Stoeckert | 322/1 |
| 3,910,623 A * | 10/1975 | McKeen | 296/91 |
| 3,971,586 A * | 7/1976 | Saunders | 296/180.4 |
| 4,075,545 A * | 2/1978 | Haberer | 322/35 |
| 4,141,425 A * | 2/1979 | Treat | 180/2.2 |
| 4,143,731 A * | 3/1979 | Haustein | 180/89.2 |
| 4,254,843 A * | 3/1981 | Han et al. | 180/165 |
| 4,314,160 A * | 2/1982 | Boodman et al. | 290/55 |
| 4,327,808 A * | 5/1982 | Howard | 180/7.4 |
| 4,362,208 A * | 12/1982 | Hauser | 165/51 |
| 4,423,368 A * | 12/1983 | Bussiere | 322/35 |
| 4,460,055 A * | 7/1984 | Steiner | 180/7.1 |
| 5,280,827 A * | 1/1994 | Taylor et al. | 180/165 |
| 5,287,004 A * | 2/1994 | Finley | 290/55 |
| 5,386,146 A * | 1/1995 | Hickey | 290/55 |
| 5,680,032 A * | 10/1997 | Pena | 290/52 |
| 5,746,283 A * | 5/1998 | Brighton | 180/65.31 |
| 5,760,515 A * | 6/1998 | Burns | 310/115 |
| 5,844,324 A * | 12/1998 | Spriggle | 290/55 |
| 5,920,127 A * | 7/1999 | Damron et al. | 290/44 |
| 5,986,429 A * | 11/1999 | Mula, Jr. | 320/101 |
| 6,138,781 A * | 10/2000 | Hakala | 180/2.2 |
| 6,361,428 B1 * | 3/2002 | Tosconi et al. | 454/137 |
| 6,373,145 B1 * | 4/2002 | Hamrick | 290/44 |

(Continued)

*Primary Examiner*—Paul N Dickson
*Assistant Examiner*—Jacob Meyer
(74) *Attorney, Agent, or Firm*—Jeffrey P. Calfa; Mark C. Bach; Gerald W. Askew

(57) ABSTRACT

A vehicle having one or more small vehicle-mounted electricity generating wind turbines located within an area of wind recirculation. The electricity generated is used to recharge vehicle batteries, partially power an auxiliary electric propulsion motor, or supply vehicle parasitic loads.

2 Claims, 10 Drawing Sheets

VEHICLE HAVING CHASSIS SKIRTS AND DECK PLATES, AND AREA OF RECIRCULATION

PARRIAL VIEW OF A VEHICLE HAVING WIND TURBINES WITHIN CHASSIS SKIRTS

U.S. PATENT DOCUMENTS

| | | | |
|---|---|---|---|
| 6,685,256 B1* | 2/2004 | Shermer | 296/180.4 |
| 6,692,066 B2* | 2/2004 | Fairburn et al. | 296/208 |
| 6,700,215 B2* | 3/2004 | Wu | 290/44 |
| 6,779,834 B1* | 8/2004 | Keller | 296/180.4 |
| 6,838,782 B2* | 1/2005 | Vu | 290/55 |
| 6,857,492 B1* | 2/2005 | Liskey et al. | 180/165 |
| 6,882,059 B1* | 4/2005 | DePaoli | 290/44 |
| 6,897,575 B1* | 5/2005 | Yu | 290/44 |
| 7,185,944 B2* | 3/2007 | Shahbazi | 296/180.1 |
| 7,216,923 B2* | 5/2007 | Wong et al. | 296/180.2 |
| 7,434,636 B2* | 10/2008 | Sutherland | 180/2.2 |
| 7,468,562 B1* | 12/2008 | Barbic | 290/40 C |
| 7,578,541 B2* | 8/2009 | Layfield et al. | 296/180.2 |
| 2002/0153178 A1* | 10/2002 | Limonius | 180/2.2 |
| 2004/0084908 A1* | 5/2004 | Vu | 290/55 |
| 2005/0103537 A1* | 5/2005 | Michaud et al. | 180/2.2 |
| 2005/0121242 A1* | 6/2005 | Robinson | 180/165 |
| 2005/0210858 A1* | 9/2005 | Gore et al. | 60/201 |
| 2006/0113118 A1* | 6/2006 | Kim | 180/2.2 |
| 2006/0213697 A1* | 9/2006 | Sutherland | 180/2.2 |
| 2006/0272863 A1* | 12/2006 | Donahue | 180/2.2 |
| 2007/0107949 A1* | 5/2007 | Bradley et al. | 180/2.2 |
| 2007/0163829 A1* | 7/2007 | Ellis | 180/165 |
| 2008/0011523 A1* | 1/2008 | Packard | 180/2.2 |

* cited by examiner

FIG. 1
ARTICULATED VEHICLE HAVING AN AIR GAP WITH AREA OF RECIRCULATION

FIG. 3
WIND TURBINE AND ELECTRICAL
GENERATOR COMBINATION

FIG. 4
ARTICULATED VEHICLE HAVING A WIND TURBINE LOCATED WITHIN AN AIR GAP

FIG. 5
VEHICLE HAVING A WIND TURBINE LOCATED IN AN AREA OF AIR RECIRCULATION

FIG. 6
VEHICLE HAVING AN ARRAY OF
WIND TURBINES

FIG. 7
VEHICLE HAVING CHASSIS SKIRTS AND DECK PLATES, AND AREA OF RECIRCULATION

FIG. 8
PARRIAL VIEW OF A VEHICLE HAVING
WIND TURBINES WITHIN
CHASSIS SKIRTS

FIG. 9
VEHICLE HAVING A MULTI-STAGE
WIND TURBINE

FIG. 10
VEHICLE HAVING A WIND TURBINE AND ELETRICAL GENERATOR, WITH POWER DISTRIBUTION SYSTEM

AIR POWER ENERGY TRANSFORMATION TO ELECTRICAL ENERGY FOR HYBRID ELECTRIC VEHICLE APPLICATIONS

BACKGROUND OF INVENTION

This invention relates to the use of one or more small vehicle-mounted wind turbines connected to one or more small generators to generate electricity for use by a vehicle when in motion. Specifically, the wind turbines are located in an area of wind recirculation in between the segments of an articulated vehicle combination, or in the aerodynamic wake behind the vehicle.

SUMMARY

With the advent of modern Hybrid Electric Vehicles, much development has occurred in the art having to do with recapturing vehicle kinetic energy and regeneration of that energy into a useable form. The primary focus of development has been in the area of regenerative vehicle braking. Other areas of development have focused upon utilizing secondary sources of available energy, such as solar energy or wind energy.

In many prior-art developments concerning the use of wind energy to provide power to Hybrid Electric Vehicles, the inventions as set forth have consumed more energy than they have produced. Specifically, they have involved vehicles having wind turbines located in the slipstream above or in front of the vehicle, or equivalently, having ducts leading from those locations to wind turbines located elsewhere on the vehicle. Because these turbines, or the ducts leading to them, were continually in the vehicle slipstream, they caused a net increase in the amount of power required to drive the vehicle to overcome air resistance. Constrained by the first law of thermodynamics, the wind turbines consumed more energy than they returned to the vehicle. The simplest model of these inventions would be a vehicle composed of a turbine, a generator, an electric motor, and wheels. The electric motor would drive the wheels to push the vehicle forward, which would cause the turbine to spin the generator in order to provide electricity to the electric motor.

One or two of these inventions have had some merit, in that the turbine has had provisions to accept an air stream from vectors other than straight forward. That is to say, if the vehicle experienced a strong sidewind, the turbine was capable of capturing the component of the air stream not generated by its own motion, and converting that into useable energy. Under conditions of a strong headwind, a vehicle equipped with a wind turbine may even be able to generate enough energy from the vector component of the air stream not generated by its own motion, to overcome the resistance caused by the movement of the additional frontal area due to the turbine through that slipstream. This would be the thermodynamic equivalent of a sailboat tacking upwind.

In the area of development having to do with Hybrid Electric Vehicles and regenerative braking, the focus has thus far been upon vehicles having a city or urban driving cycle. These vehicles, typically passenger vehicles and delivery vehicles, use large amounts of energy accelerating and accumulating kinetic energy, which is then lost upon braking. The objective of regenerative braking is to return a portion of that kinetic energy to storage in the form of electrical potential for subsequent use. For vehicles having a highway or long-haul driving cycle, such as line-haul trucks, the driving profile involves considerably less braking, and more expenditure of energy overcoming wind resistance.

There exists an area of air movement relative to a moving vehicle that heretofore remains unexploited as a source of energy, and which presents the possibility of extracting energy from said air movement without requiring additional energy in order to move the vehicle. To an even greater degree of benefit, extracting energy from this area of air movement may even decrease the amount of energy required to move the vehicle. That area of air movement is the area of recirculation in between the segments of an articulated vehicle combination, or in the aerodynamic wake behind the vehicle.

Articulated moving vehicles, such as highway tractor and semi-trailer combinations, possess a large gap between the tractor and trailer due to constraints having to do with articulation at low speeds. At high speeds, air passing over and around the vehicle recirculates within this gap. As a moving fluid exerts less pressure and as a greater velocity of relative movement occurs near the rear side of the tractor cab due to this recirculation, the net pressure differential between the forward side of the tractor portion of the vehicle and the rearward side of the tractor portion of the vehicle is increased as a result of this recirculation. Extracting energy from this recirculating air mass not only provides a source of energy, but also reduces this net pressure differential, thus reducing overall wind resistance. An additional principle in operation under this circumstance is based on the fact that this rotating air mass further disturbs the air flowing past the gap, and as a result promotes turbulent air flow relative to the vehicle, thereby increasing overall wind resistance.

A similar principle operates within the wake of the moving vehicle. At that point, the airflow past the vehicle has generally deteriorated to a turbulent state, such that less steady-state recirculation is taking place. However, there is still a significant component of steady-state recirculation combined with shedding vortices. This steady-state component of recirculation again causes the exertion of less pressure by the moving fluid, resulting in an increase in pressure differential between the forward side of the moving vehicle and the rearward side of the moving vehicle. By extracting energy from the recirculating air mass, the pressure differential between the forward side of the moving vehicle and the rearward side of the moving vehicle is reduced. This again reduces overall wind resistance.

In no way does the present invention claim to extract enough energy from the recirculating air mass to fully propel the vehicle. If it did, it would be a violation of the first law of thermodynamics. However, sufficient energy may be extracted from these regions of recirculation using small, strategically placed wind turbines coupled to efficient generators to generate fifty to one hundred amperes of useable electrical power. This figure assumes a recirculating wind speed of approximately twenty meters per second, a turbine diameter of approximately half a meter, and sea-level standard atmospheric conditions. The power generated may be used to supply vehicle parasitic loads, or it may be used to partially charge vehicle batteries.

The multiple embodiments of the invention disclosed herein each involve the use of one or more such wind turbine driven generators in certain strategic locations, such as directly behind the cab of a highway tractor and semi-trailer combination, between the frame rails and skirts of such a vehicle, or in the wake area located behind a given vehicle. A single axial flow turbine driven generator, an array of such generators, or even a multi-stage axial flow turbine driven generator may be used.

DETAILED DESCRIPTION

Figure 1:
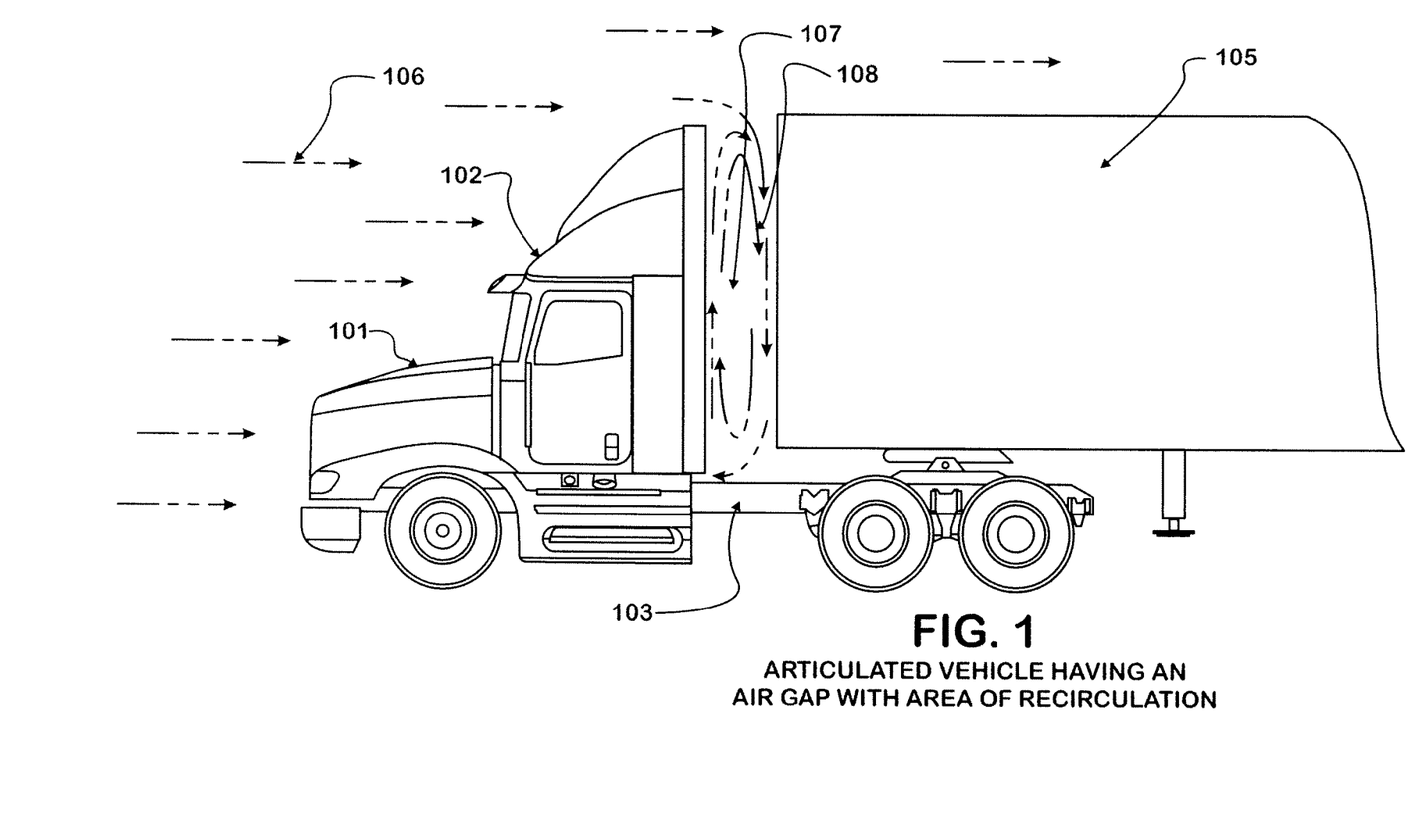
FIG. 1—A side view of an articulated vehicle having a gap and an area of air recirculation therein.

The vehicle 101 shown in FIG. 1 has a cab 102 attached to a chassis 103, and is adapted to pull a semi-trailer 105, which semi-trailer 105 is partially shown. FIG. 1 further shows airflow 106 relative to the moving vehicle 101. Located between the cab 102 of the vehicle 101 and the semi-trailer 105 attached to the vehicle 101, is a vehicle gap 107, within which exists an area of air recirculation 108.

Figure 2:
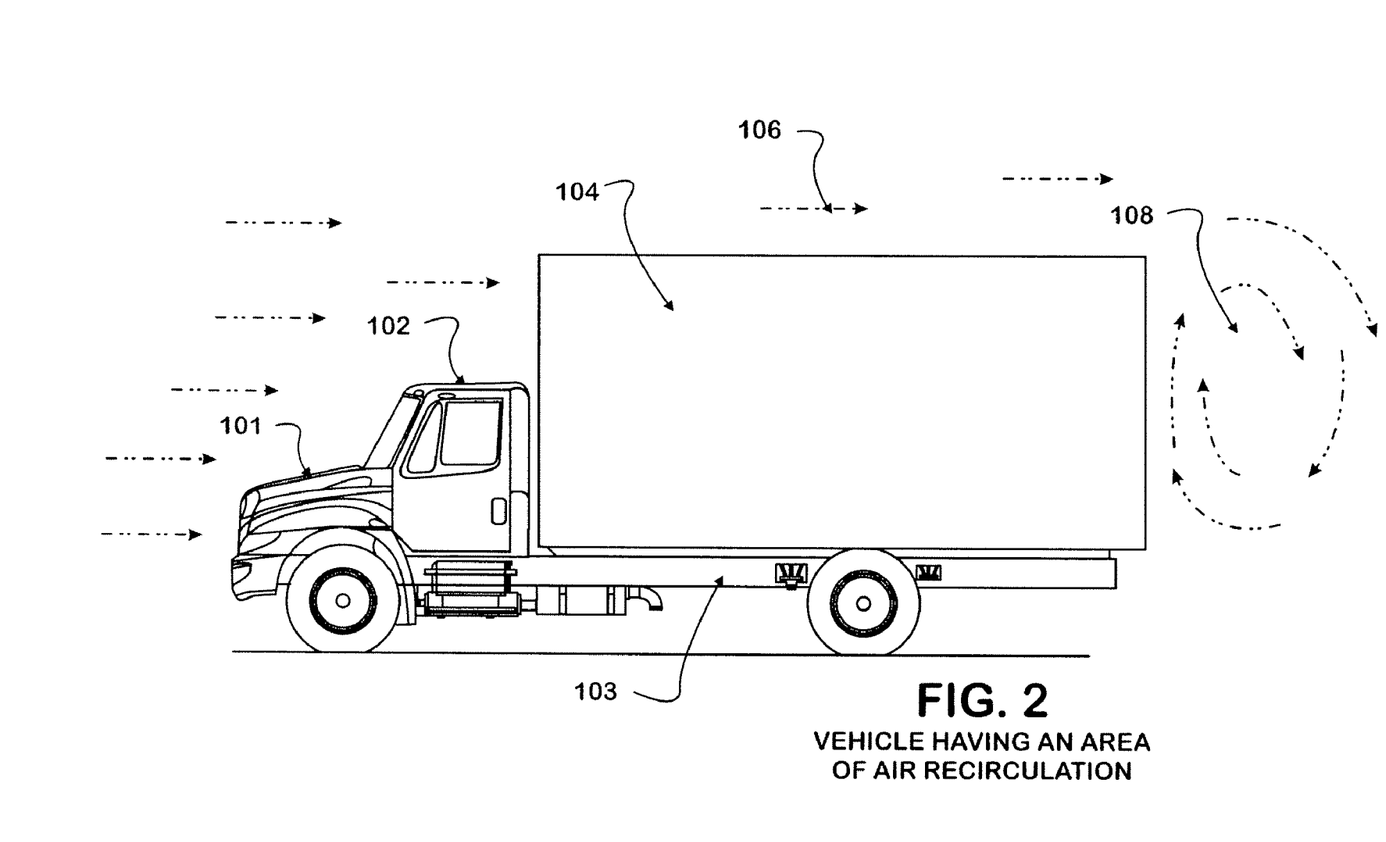
FIG. 2—A side view of a vehicle having an area of air recirculation in its wake area.

The vehicle 101 shown in FIG. 2 has a cab 102 attached to a chassis 103, and is provided with a cargo-carrying body section 104. Airflow 106 is shown relative to the moving vehicle 101, behind which vehicle 101 exists an area of recirculation 108.

Figure 3:
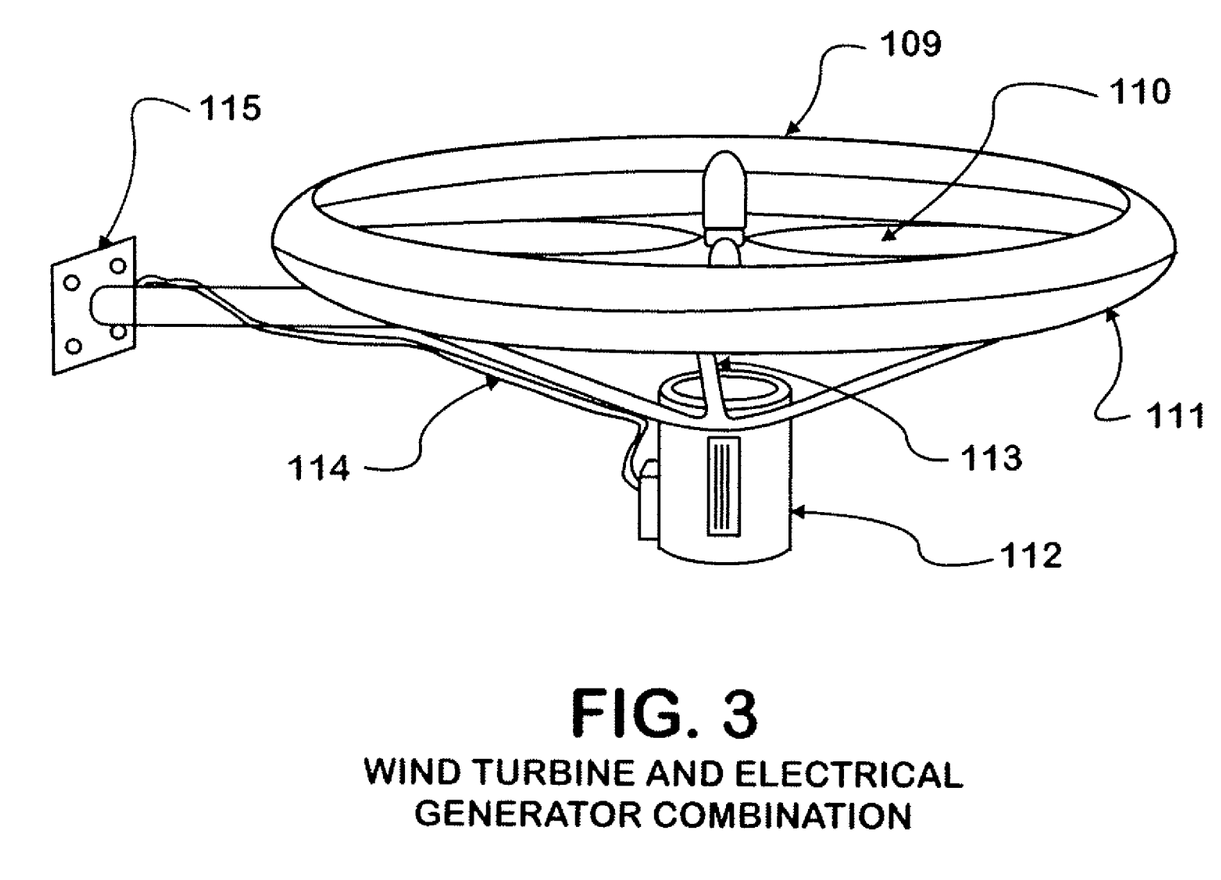
FIG. 3—A view of a wind turbine coupled to an electrical generator.

FIG. 3 shows a wind turbine 109 having turbine blades 110 coupled to a generator 112 by means of a shaft 113. The wind turbine 109 may be provided with a turbine housing 111, within which the turbine blades 110 rotate. The wind turbine 109 is supported by a turbine mounting 115. The generator 112 provides electrical power by means of electrical leads 114.

Figure 4:
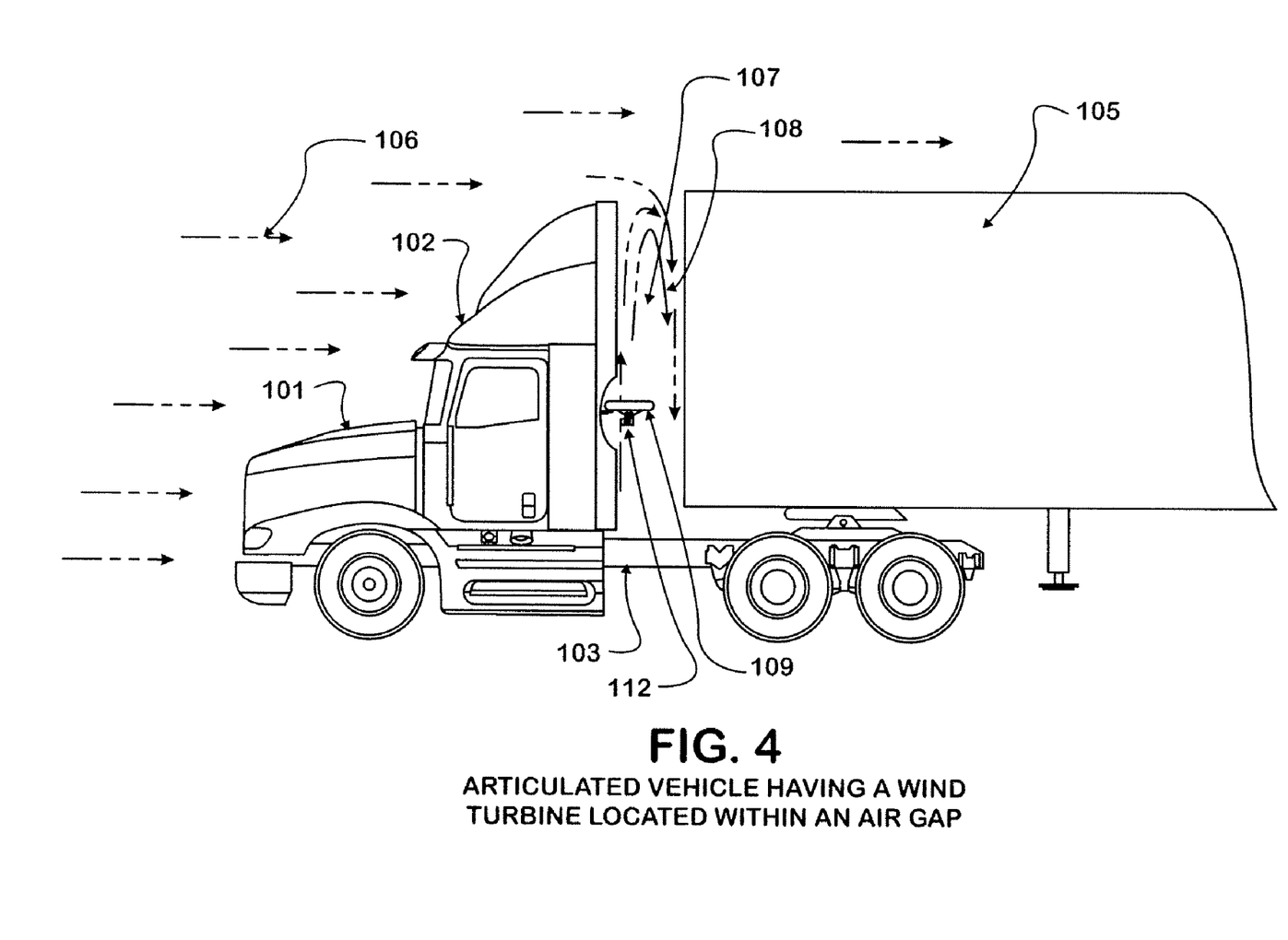
FIG. 4—A view of a first embodiment of the invention.

The vehicle 101 shown in FIG. 4 has a cab 102 attached to a chassis 103, similar to the vehicle 101 shown in FIG. 1. The vehicle 101 shown in FIG. 4 is again adapted to pull a semi-trailer 105, which semi-trailer 105 is partially shown. FIG. 4 further shows the airflow 106 relative to the moving vehicle 101, the vehicle gap 107, and the area of air recirculation 108. Attached to the cab 102, and located within the area of air recirculation 108, is a wind turbine 109 and generator 112. By means of the wind turbine 109 and generator 112, a portion of the energy contained within the recirculating air 108 is converted to electrical energy for use by the vehicle 101.

Figure 5:
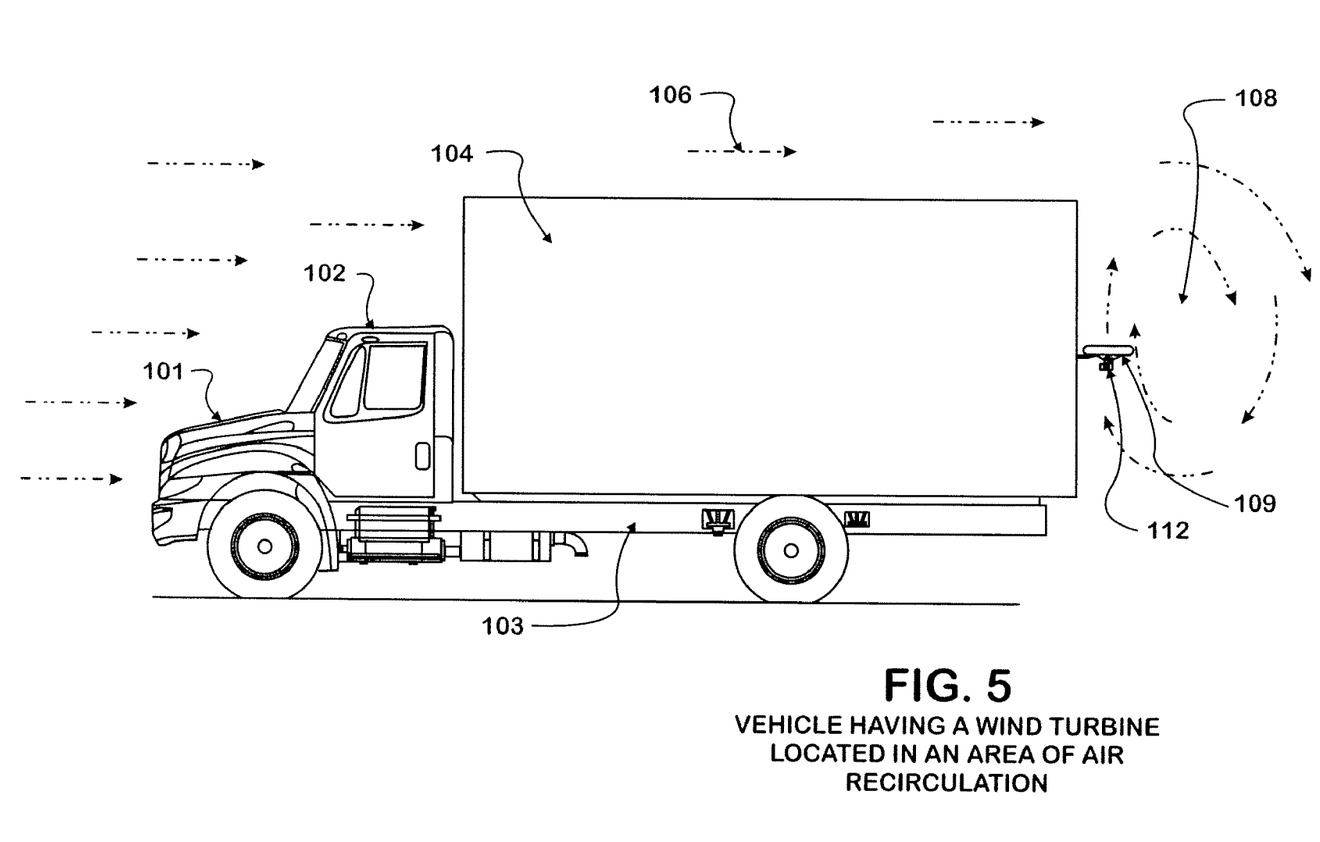
FIG. 5—A view of a second embodiment of the invention.

The vehicle 101 shown in FIG. 5 has a cab 102 attached to a chassis 103, and is provided with a cargo-carrying body section 104, similar to the vehicle 101 shown in FIG. 2. FIG. 5 shows the airflow 106 relative to the moving vehicle 101, as well as an area of recirculation 108. Attached to the cargo-carrying body section 104, and located within the area of air recirculation 108, is a wind turbine 109 and generator 112. By means of the wind turbine 109 and generator 112, a portion of the energy contained within the recirculating air 108 is converted to electrical energy for use by the vehicle 101.

Figure 6:
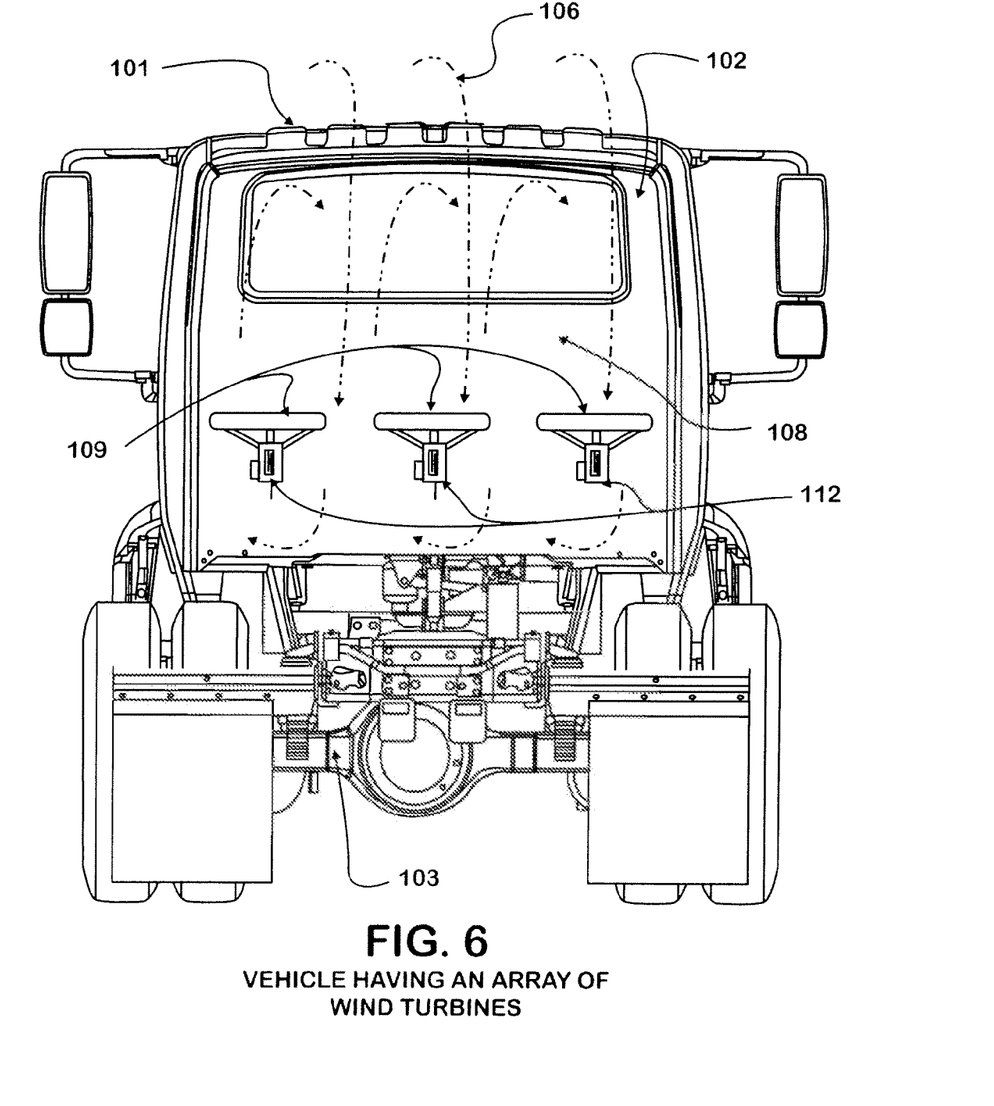
FIG. 6—A view of a third embodiment of the invention.

FIG. 6 shows a rear view of a vehicle 101 having a cab 102 attached to a chassis 103. Similar to the vehicle 101 in FIG. 1, the vehicle 101 in FIG. 6 is adapted to pull a semi-trailer 105, which is not shown in FIG. 6. Airflow 106 is shown entering the area of air recirculation 108. An array of wind turbines 109 and generators 112 are attached to the cab 102 of vehicle 101. By means of the wind turbines 109 and generators 112, a portion of the energy contained within the recirculating air 108 is converted to electrical energy for use by the vehicle 101.

Figure 7:
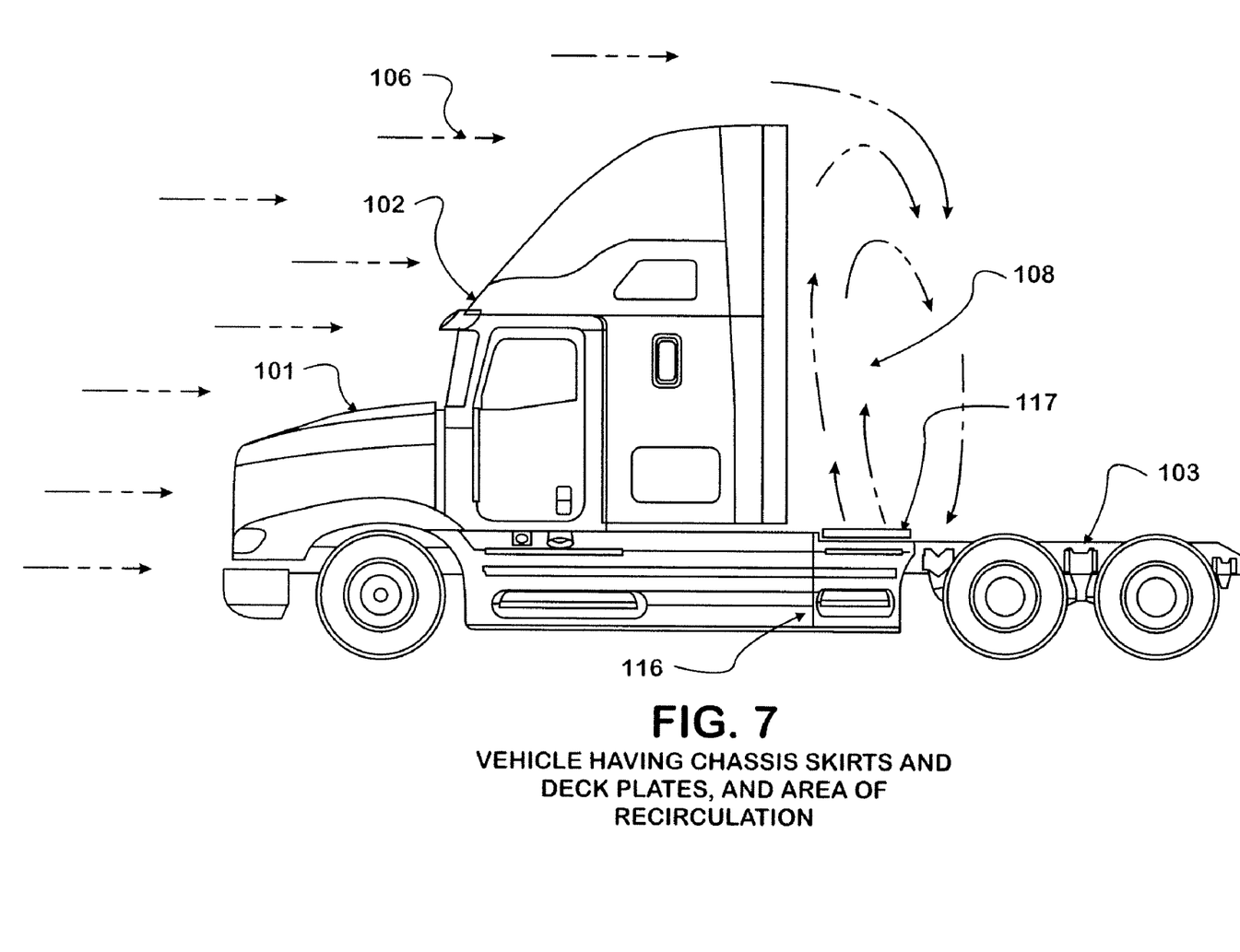
FIG. 7—A side view of a vehicle having an area of recirculation extending through its chassis.

The vehicle 101 shown in FIG. 7 has a cab 102 attached to a chassis 103, and is adapted to pull a semi-trailer 105, similar to the vehicle 101 shown in FIG. 1. The semi-trailer 105 is not shown in FIG. 7. The vehicle 101 is provided with chassis skirts 116 and deck plates 117. Airflow 106 is shown entering an area of recirculation 108, which area of recirculation 108 extends through the chassis 103, passes within the area defined by the chassis skirts 116, and flows upwards through the deck plates 117.

Figure 8:
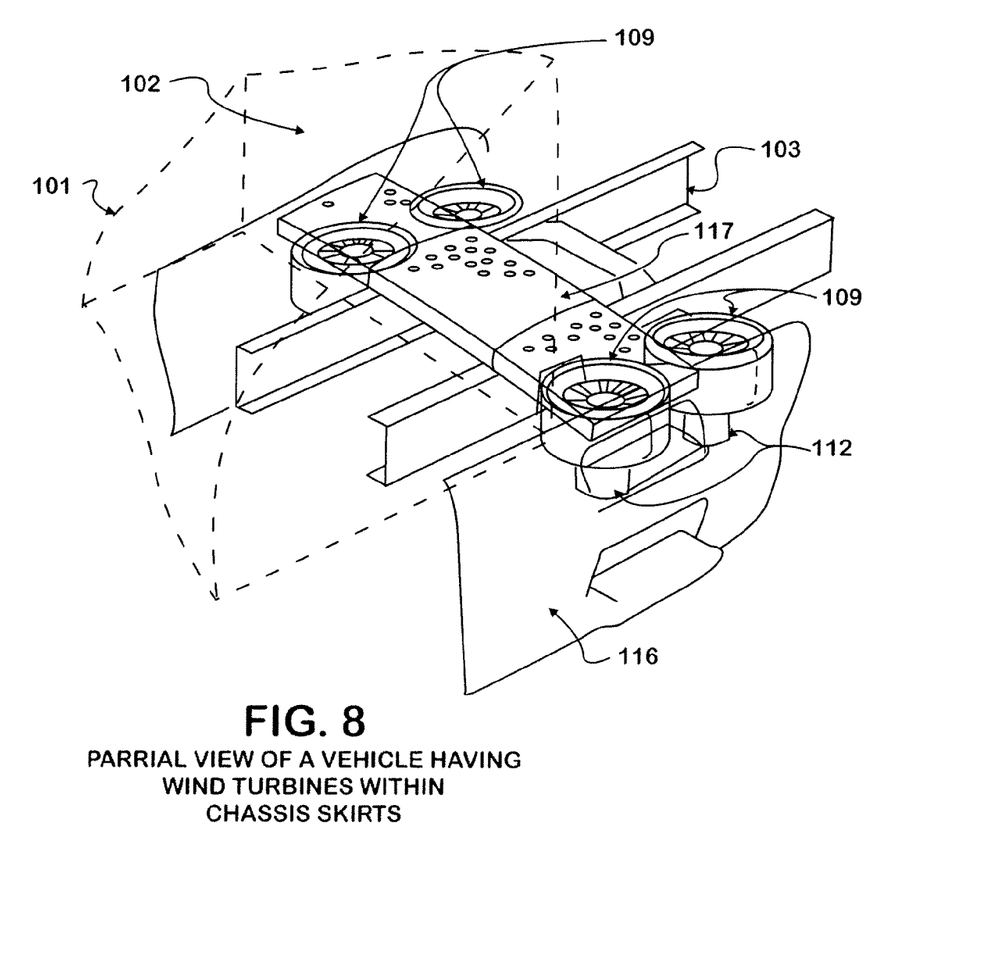
FIG. 8—A partial view of a fourth embodiment of the invention.

FIG. 8 shows a partial view of a vehicle 101, including a partial outline view of a cab 102 attached to a chassis 103, which chassis 103 is also partially shown. Similar to the vehicle 101 shown in FIG. 7, the vehicle shown in FIG. 8 is provided with chassis skirts 116 and deck plates 117. Wind turbines 109 and generators 112 are attached to the chassis 103, and are located beneath the deck plates 117 and in between the chassis skirts 116.

Figure 9:
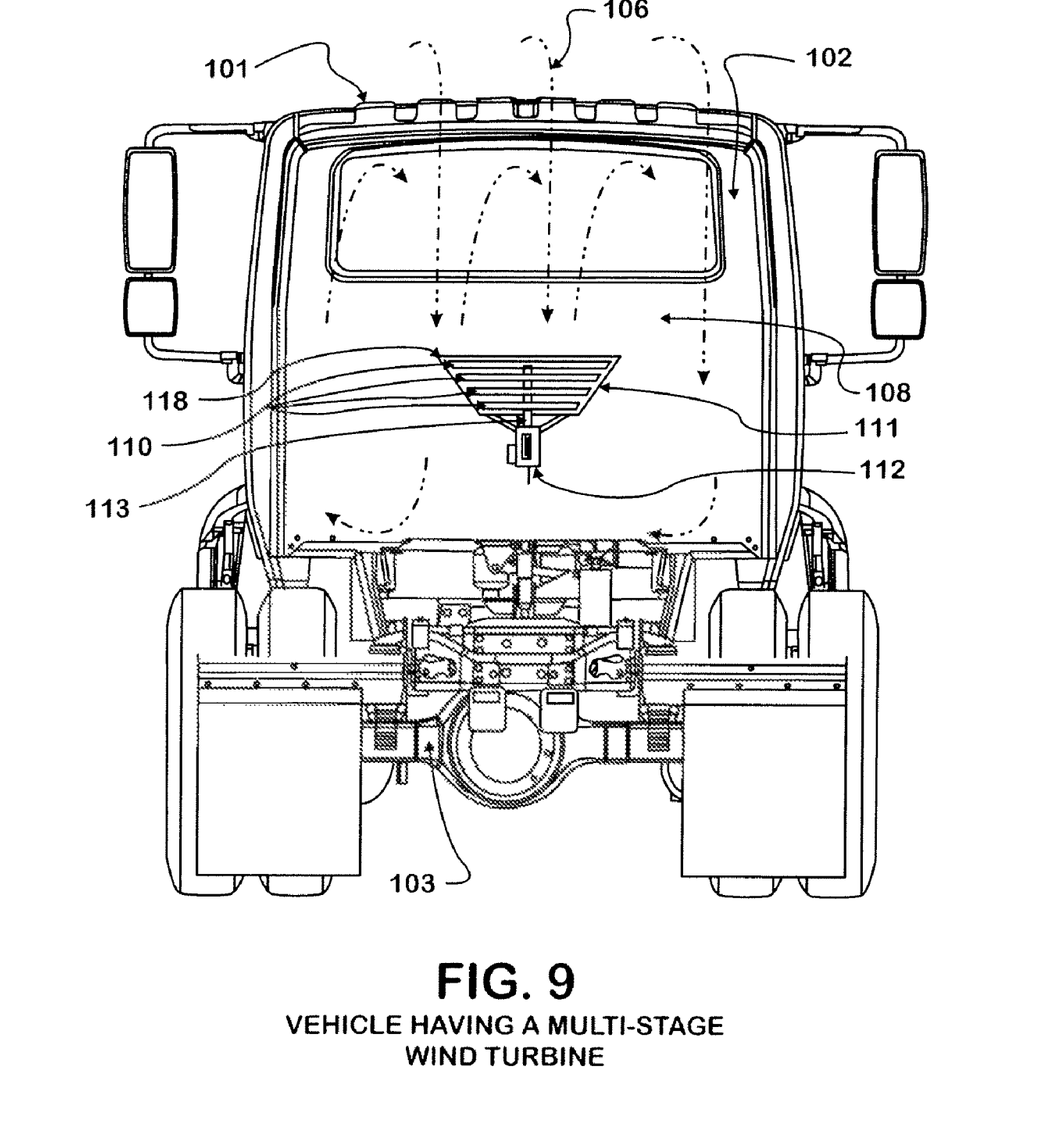
FIG. 9—A view of a fifth embodiment of the invention.

FIG. 9 shows a rear view of a vehicle 101 having a cab 102 attached to a chassis 103. Similar to the vehicle 101 shown in FIG. 1, the vehicle 101 shown in FIG. 9 is adapted to pull a semi-trailer 105, which is not shown in FIG. 9. Airflow 106 is shown entering the area of air recirculation 108. A multi-stage wind turbine 118 is attached to the cab 102 of the vehicle 101, which multi-stage wind turbine 118 is provided with multiple sets of turbine blades 110. The multiple sets of turbine blades 110 rotate within the turbine housing 111 upon a shaft 113, which shaft 113 in turn drives the generator 112, thereby converting a portion of the energy contained within the recirculating air 108 into electrical energy for use by the vehicle 101.

Figure 10:
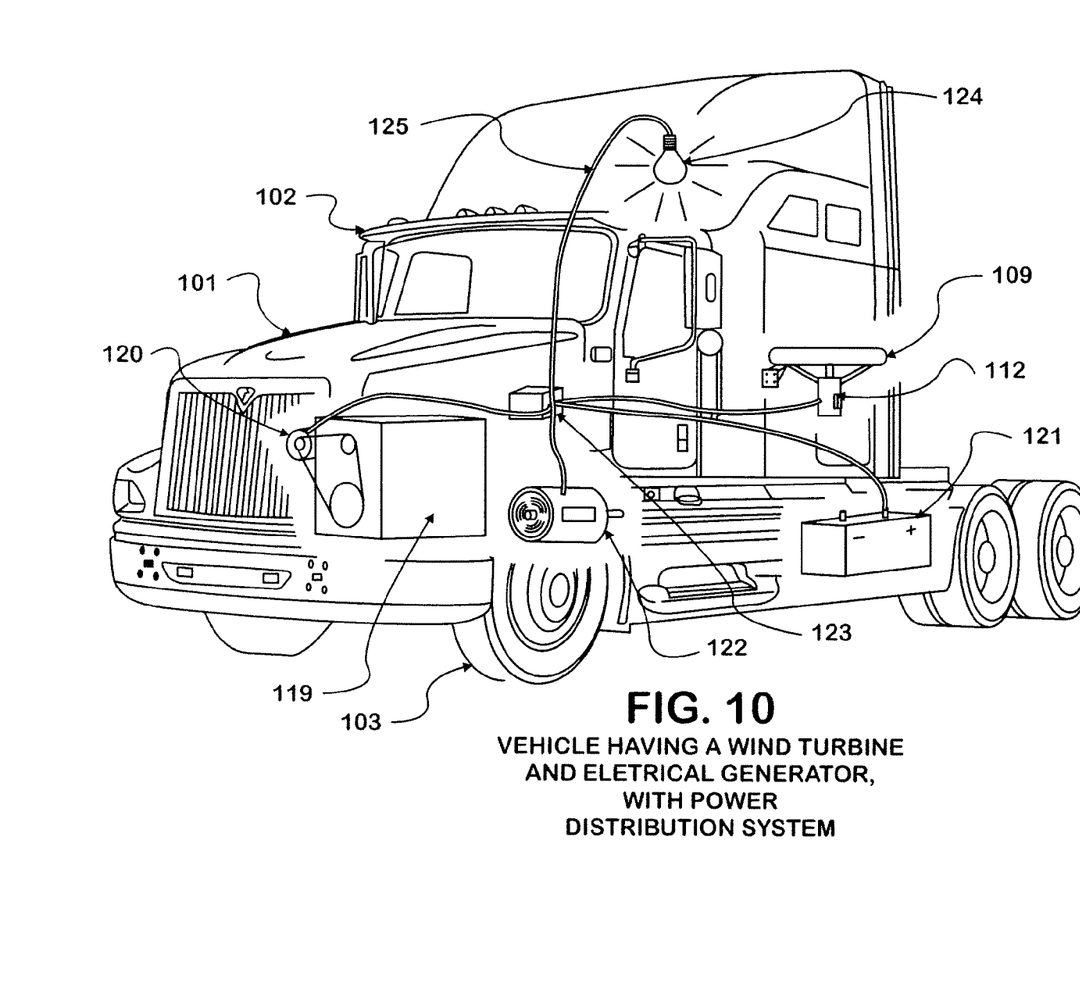
FIG. 10—A power diagram of a vehicle having a wind turbine coupled to an electrical generator.

FIG. 10 shows a vehicle 101 having a cab 102 attached to a chassis 103. Similar to the vehicle 101 shown in FIG. 1, the vehicle 101 shown in FIG. 10 is adapted to pull a semi-trailer 105, which is not shown in FIG. 10. The vehicle 101 is provided with a wind turbine 109, which wind turbine 109 drives a generator 112. The vehicle 101 is further provided with an engine 119 for propulsion, which engine 119 also drives a primary generator 120. The vehicle 101 may also be provided with an auxiliary electric motor 122 for propulsion. The vehicle 101 also possesses one or more vehicle batteries 121, and vehicle parasitic loads 124. A vehicle system controller 123 is connected to and manages power flow to and from each of the generator 112 driven by the wind turbine 109, the primary generator 120 driven by the engine 119, the vehicle batteries 121, the auxiliary electric motor 122 if one is present, and the vehicle parasitic loads 124, by means of a power distribution network 125.

Other permutations of the invention are possible without departing from the teachings disclosed herein, provided that the function of the invention is to generate usable electrical power by extracting wind energy from an area of recirculation between the segments of a moving vehicle, or from an area of recirculation within the wake of a moving vehicle. Other advantages to a vehicle equipped with a wind turbine driven generator within an area of recirculation may also be inherent in the invention, without having been described above.

We claim:

1. A vehicle for operation on the ground, the vehicle having an area of wind recirculation when in motion, the vehicle further having a cab, chassis, chassis skirts, and deck plates, comprising:
- at least one axial air turbine for extracting mechanical energy from the area of wind recirculation, the at least one axial air turbine being located within the area of wind recirculation;
- at least one generator attached to and driven by the at least one axial air turbine, the at least one axial air turbine-driven generator converting the mechanical energy to electrical energy;
- means for distributing the electrical energy, the means for distributing the electrical energy being connected to the at least one axial air turbine-driven generator;
- the area of wind recirculation extending between the chassis skirts and below the vertical level of the deck plates;
- the at least one axial air turbine being attached to the chassis below the vertical level of the deck plates, and within the area of wind recirculation; and
- the at least one axial turbine extracting mechanical energy at least from upwards air movement from the area of wind recirculation located between the chassis skirts and behind the cab.

2. A vehicle for operation on the ground, the vehicle having an area of wind recirculation when in motion, the vehicle further having a cab, chassis, chassis skirts, and deck plates, comprising:
- at least one axial air turbine for extracting mechanical energy from the area of wind recirculation, the at least one axial air turbine being located within the area of wind recirculation;
- at least one generator attached to and driven by the at least one axial air turbine, the at least one axial air turbine-driven generator converting the mechanical energy to electrical energy;
- an engine and a primary engine-driven generator;
- a system controller for controlling distribution of the electrical energy;
- a power distribution network, the power distribution network being connected to the at least one axial air turbine-driven generator, to the primary engine-driven generator, and to the system controller;
- the area of wind recirculation extending between the chassis skirts and below the vertical level of the deck plates; and
- the at least one axial air turbine being attached to the chassis below the vertical level of the deck plates, and within the area of wind recirculation; and
- the at least one axial turbine extracting mechanical energy at least from upwards air movement from the area of wind recirculation located between the chassis skirts and behind the cab.

* * * * *